United States Patent
Hirai

(10) Patent No.: US 9,773,198 B2
(45) Date of Patent: Sep. 26, 2017

(54) PRINT CONTROL APPARATUS, PRINT CONTROL METHOD, AND STORAGE MEDIUM

(71) Applicant: CANON KABUSHIKI KAISHA, Tokyo (JP)

(72) Inventor: Yoshiyuki Hirai, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/164,584

(22) Filed: May 25, 2016

(65) Prior Publication Data

US 2016/0267363 A1 Sep. 15, 2016

Related U.S. Application Data

(63) Continuation of application No. 14/820,311, filed on Aug. 6, 2015, now Pat. No. 9,375,961.

(30) Foreign Application Priority Data

Aug. 8, 2014 (JP) ................................ 2014-162929

(51) Int. Cl.
| | |
|---|---|
| *G06F 15/00* | (2006.01) |
| *G06K 15/02* | (2006.01) |
| *B41J 29/38* | (2006.01) |
| *G06F 3/12* | (2006.01) |
| *G03G 15/00* | (2006.01) |

(52) U.S. Cl.
CPC ............ *G06K 15/021* (2013.01); *B41J 29/38* (2013.01); *G03G 15/50* (2013.01); *G06F 3/1204* (2013.01); *G06F 3/1205* (2013.01); *G06F 3/1206* (2013.01); *G06F 3/1253* (2013.01); *G06F 3/1255* (2013.01); *G06F 3/1257* (2013.01); *G06F 3/1258* (2013.01); *G06F 3/1285* (2013.01)

(58) Field of Classification Search
None
See application file for complete search history.

(56) References Cited

U.S. PATENT DOCUMENTS

2011/0242584 A1* 10/2011 Igarashi ................ G06F 3/1205
358/1.15

* cited by examiner

*Primary Examiner* — Helen Q Zong
(74) *Attorney, Agent, or Firm* — Canon U.S.A., Inc. IP Division

(57) ABSTRACT

A printing apparatus to communicate with a terminal apparatus, includes a storing unit, an acquiring unit, a receiving unit, and a printing unit. The storing unit stores information for specifying first paper types selectable in the terminal apparatus. The terminal apparatus acquires the information from the printing apparatus and displays the first paper types as selection candidate paper types. The acquiring unit acquires a second paper type. The receiving unit receives a first paper type from the first paper types for printing of an image. The printing unit prints the image where the first paper type corresponding to second paper types is received and any of the second paper types corresponding to the first paper type is acquired, and does not print the image where the first paper type corresponding to second paper types is received and another second paper type different from the second paper types is acquired.

23 Claims, 10 Drawing Sheets

PAPER INFORMATION REGISTRATION SCREEN (401)

PAPER INFORMATION (500) OF PRINTING APPARATUS

| PAPER INFORMATION OF PRINTING APPARATUS ||||
|---|---|---|---|
| PAPER FEED PORT | PAPER SIZE | PAPER TYPE CATEGORY | PAPER TYPE |
| PAPER FEEDING UNIT A | L-SIZE | PHOTO PAPER | GLOSSY PHOTO PAPER |
| PAPER FEEDING UNIT B | A4 | PHOTO PAPER | MATTE PHOTO PAPER |

| PAPER TYPE | PAPER TYPE CATEGORY |
|---|---|
| PLAIN PAPER | PLAIN PAPER CATEGORY |
| POSTCARD | ENVELOP PAPER CATEGORY |
| ENVELOP | ENVELOP CATEGORY |
| HIGH-CLASS PHOTO PAPER | PHOTO PAPER CATEGORY |
| CHEAP PHOTO PAPER | PHOTO PAPER CATEGORY |
| MATTE PHOTO PAPER | PHOTO PAPER CATEGORY |
| GLOSSY PHOTO PAPER | PHOTO PAPER CATEGORY |
| SILKY PHOTO PAPER | PHOTO PAPER CATEGORY |
| FILM PHOTO PAPER | PHOTO PAPER CATEGORY |

FIG. 7

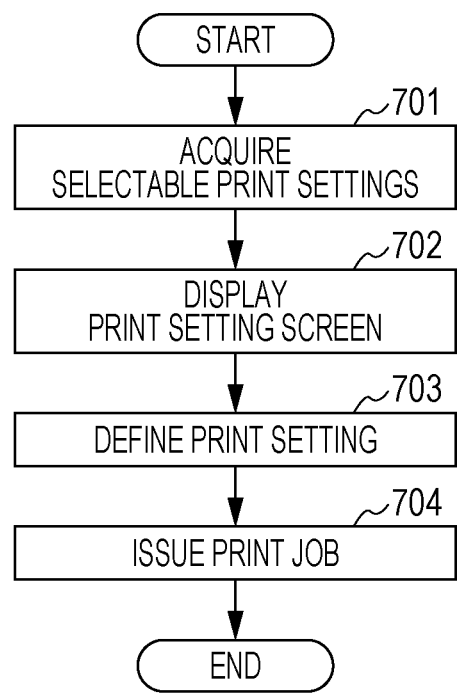

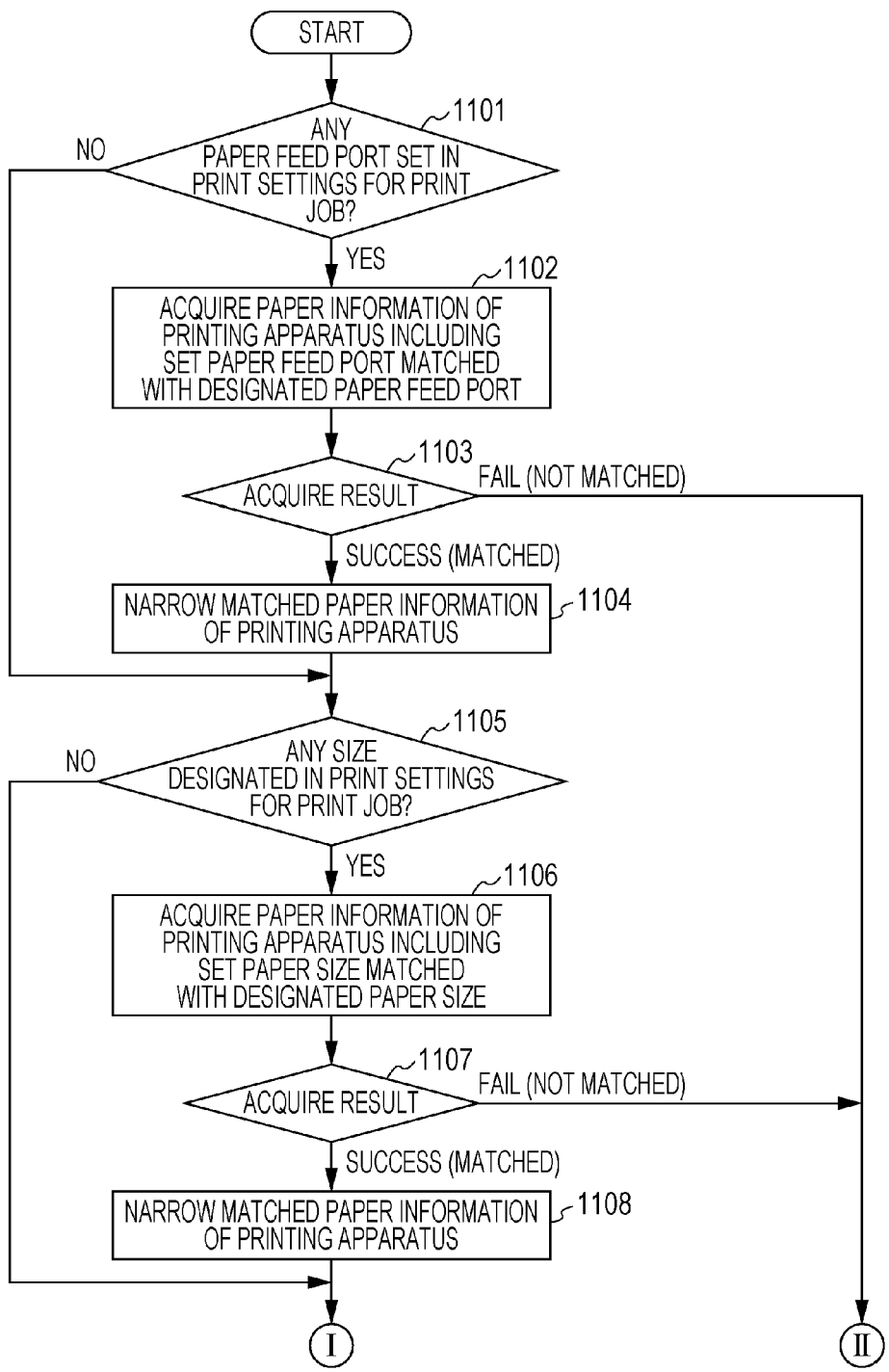

FIG. 12A

PAPER INFORMATION (500) OF PRINTING APPARATUS

| PAPER INFORMATION OF PRINTING APPARATUS | | | |
|---|---|---|---|
| PAPER FEED PORT | PAPER SIZE | PAPER TYPE CATEGORY | PAPER TYPE |
| PAPER FEEDING UNIT A | L-SIZE | PHOTO PAPER | GLOSSY PHOTO PAPER |
| PAPER FEEDING UNIT B | A4 | PHOTO PAPER | MATTE PHOTO PAPER |

FIG. 12B

PRINT SETTINGS (1210) OF TERMINAL APPARATUS

| | PRINT SETTINGS OF PRINTING APPARATUS | | |
|---|---|---|---|
| | PAPER FEED PORT | PAPER SIZE | PAPER TYPE CATEGORY |
| CASE 1 | PAPER FEEDING PORT B | A4 | PHOTO PAPER |
| CASE 2 | AUTOMATIC | L-SIZE | PHOTO PAPER |
| CASE 3 | AUTOMATIC | A4 | PLAIN PAPER |

FIG. 12C

SETTING RESULT (1220)

| | SETTING RESULT |
|---|---|
| | PAPER TYPE |
| CASE 1 | MATTE PHOTO PAPER |
| CASE 2 | GLOSSY PHOTO PAPER |
| CASE 3 | CANCEL |

PRINT CONTROL APPARATUS, PRINT CONTROL METHOD, AND STORAGE MEDIUM

CROSS REFERENCE TO RELATED APPLICATIONS

The present application is a continuation of U.S. patent application Ser. No. 14/820,311, filed on Aug. 6, 2015, which claims priority from Japanese Patent Application No. 2014-162929, filed Aug. 8, 2014, all of which are hereby incorporated by reference herein in their entirety.

BACKGROUND OF THE INVENTION

Field of the Invention

The present invention relates to a print control apparatus causing a printing apparatus to print an image, a print control method, and a storage medium.

Description of the Related Art

According to a technology in the past, a printing apparatus performs processing based on the type indicating the property of print paper and a characteristic (hereinafter, called a paper type) of a surface of print paper for appropriate printing on the print paper. Various paper types are available such as plain paper usable for printing text mainly and photographic paper or photo paper usable for printing a photograph mainly. For example, an ink jet printer may perform printing suitable for a given paper type by changing the ink ejection amount and the ink type based on the paper type.

Japanese Patent Laid-Open No. 2009-51221 discloses that the paper type of print papers set in a printing apparatus is registered with the printing apparatus.

However, even in a case where the paper type of print papers set in a printing apparatus is registered with the printing apparatus as disclosed in Japanese Patent Laid-Open No. 2009-51221, designating an appropriate paper type may sometimes not be easy for users.

For example, many types of photographic paper are available such as a glossy type, a matt type, a silky type, a high-class type, and a cheap type. These various paper types may prevent a user from designating an appropriate paper type.

SUMMARY OF THE INVENTION

According to an aspect of the present invention, a printing apparatus which communicates with a terminal apparatus, the printing apparatus includes a storing unit configured to store information for specifying first paper types selectable in the terminal apparatus, wherein the terminal apparatus acquires the information from the printing apparatus and displays the first paper types as selection candidate paper types based on the information, an acquiring unit configured to acquire a second paper type of a print paper set in the printing apparatus, a receiving unit configured to receive a first paper type which is selected by a user on the terminal apparatus from the first paper types for printing of an image, and a printing unit configured to print the image, in a case where the first paper type corresponding to second paper types is received by the receiving unit and any of the second paper types corresponding to the first paper type is acquired by the acquiring unit, and not to print the image, in a case where the first paper type corresponding to second paper types is received by the receiving unit and another second paper type different from the second paper types is acquired by the acquiring unit.

The present invention provides a technology which allows a user to easily designate a setting regarding an attribute of print paper and allows appropriate printing according to an attribute of print paper set in a printing apparatus. The present invention allows a user to easily designate a setting regarding an attribute of print paper and allows appropriate printing according to the attribute of print paper set in a printing apparatus. More specifically, a print control apparatus according to the present invention causes the printing apparatus to print an image in accordance with the attribute if a category designated by a user of categories of attributes of print paper supported by the printing apparatus is matched with a category including an attribute of print paper set in the printing apparatus. Further features of the present invention will become apparent from the following description of exemplary embodiments with reference to the attached drawings.

BRIEF DESCRIPTION OF THE DRAWINGS

FIG. 6 illustrates correspondence between paper types and paper type categories.

FIG. 7 is a flowchart illustrating a print job issuing process to be performed by a terminal apparatus.

FIGS. 11A and 11B illustrate a flowchart describing details of a comparison process in print setting to be performed by a printing apparatus.

FIGS. 12A to 12C illustrate examples of results of a print setting process according to an embodiment.

DESCRIPTION OF THE EMBODIMENTS

Embodiments of the present invention will be described below.

Figure 1:
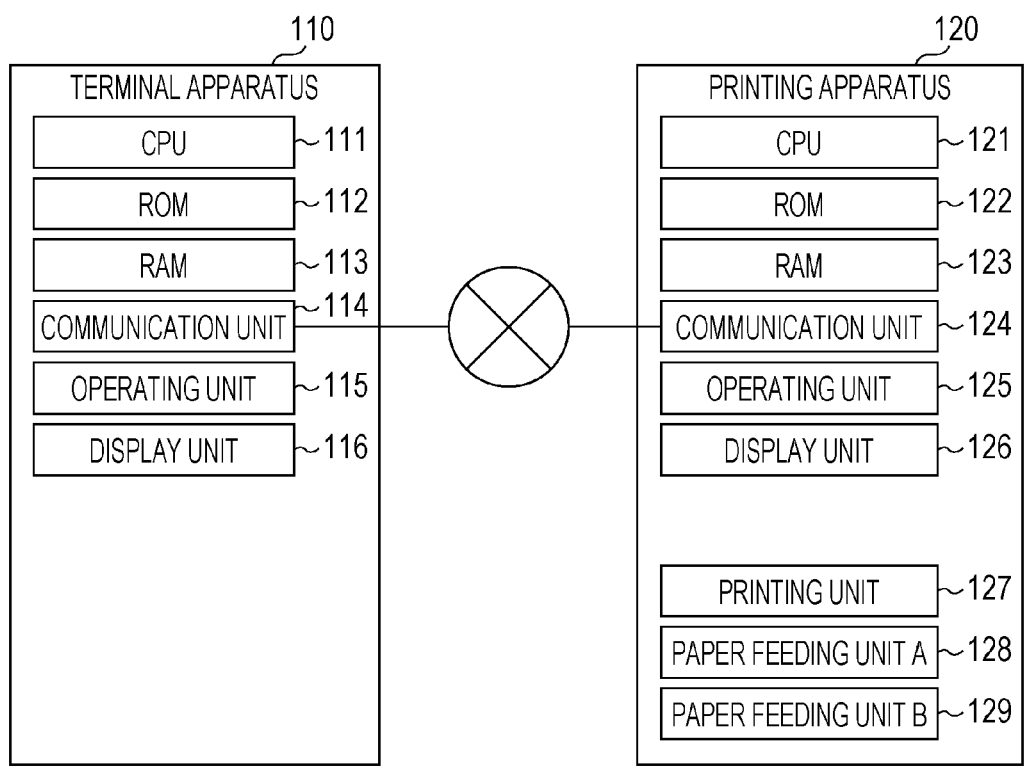
FIG. 1 illustrates a system configuration of a printing system according to an embodiment.

FIG. 1 illustrates a system configuration of a printing system according to an embodiment.

The printing system according to this embodiment includes a terminal apparatus 110 configured to generate a print job and a printing apparatus 120 configured to issue a print instruction, receive a print job and perform printing processing.

The terminal apparatus 110 includes a CPU 111, a ROM 112, a RAM 113, a communication unit 114, an operating unit 115, and a display unit 116. The components of the terminal apparatus 110 are connected via a bus.

The CPU 111 is a control unit configured to generally control the terminal apparatus 110. The ROM 112 is a non-volatile memory configured to store a program and parameter for controlling the terminal apparatus 110. The RAM 113 is a volatile memory functioning as a work memory usable when a process is executed by the CPU 111, for example.

The CPU 111 decompresses and executes in the RAM 113 a program stored in the ROM 112 to execute a corresponding process in the terminal apparatus 110. For example, the CPU 111 generates a print job for causing the printing apparatus 120 to print an image and transmits the print job to the printing apparatus 120.

The communication unit 114 is an interface for communication with an external apparatus and is capable of transmitting information to an external apparatus and receiving information from an external apparatus, under control of the CPU 111. The communication unit 114 may be a wired or wireless interface. The applicable communication system may be a wireless or wired LAN, for example, or may be any other systems such as a USB and an NFC (Near Field Communication).

The operating unit 115 is an operating device to be operated by a user. The operating unit 115 may be a key, a touch pad, a mouse, a keyboard, a stick device, a wheel device or the like. In accordance with an operation performed by a user on the operating unit 115, an instruction from the user is input to the CPU 111. The display unit 116 is configured to display information such as an image and an icon under control of the CPU 111. The operating unit 115 and display unit 116 may be integrated into a touch panel.

In this configuration, when the terminal apparatus 110 generates a print job, for example, the CPU 111 causes the display unit 116 to display print setting information. Then, a user may operate the operating unit 115 to select a desired print setting on the display unit 116 and issue a print instruction. In response to the print instruction, the CPU 111 generates print job data including the print setting selected by the user and causes the communication unit 114 to transmit the print job data to the printing apparatus 120 connected to the communication unit 114.

The CPU 111 may include image data of an image to be printed in the print job data or may separately transmit an image to be printed. Alternatively, information (such as a URL) describing a storage location where an image to be printed is stored may be transmitted instead of the image itself.

The terminal apparatus 110 is a mobile terminal such as a cellular phone or a smart phone. An image processing device such as a personal computer or a server or an apparatus such as a camera may execute a process in the terminal apparatus 110 according to this embodiment.

Next, a configuration of the printing apparatus 120 will be described.

The printing apparatus 120 includes a CPU 121, a ROM 122, a RAM 123, a communication unit 124, an operating unit 125, a display unit 126, and printing unit 127, a paper feeding unit A 128, and a paper feeding unit B 129.

The CPU 121 is a control unit configured to generally control the printing apparatus 120. The ROM 122 is a non-volatile memory configured to store a program and parameter for controlling the printing apparatus 120. The RAM 123 is a volatile memory functioning as a work memory usable when the CPU 121 executes a process, for example.

The CPU 121 decompresses and executes in the RAM 123 a program stored in the ROM 122 to execute a process in the printing apparatus 120.

The communication unit 124 is a wireless or wired interface having the same configuration as that of the communication unit 114 in the terminal apparatus 110 and performs communication based on one of the communication systems. The operating unit 125 is an operating device to be operated by a user and may be of any type, like the operating unit 115 in the terminal apparatus 110. In accordance with an operation performed by a user on the operating unit 125, an instruction from the user is input to the CPU 121. The display unit 126 is configured to display information such as an image and an icon under control of the CPU 121. The operating unit 125 and display unit 126 may be integrated into a touch panel, like the terminal apparatus 110.

The printing unit 127 is a printing device configured to print an image on a print medium such as print paper. The printing unit 127 performs inkjet printing which ejects ink to a print medium for printing. However, printing may be performed based on electrophotography which applies toner to a print medium or other systems.

Each of the paper feeding unit A 128 and paper feeding unit B 129 is configured to store print papers on which an image is to be printed by the printing unit 127 and feed print paper to the printing unit 127. The paper feeding unit A 128 and the paper feeding unit B 129 are paper feeding units which are independent from each other and are capable of storing and feeding print papers having different sizes from each other and of different types from each other.

In this configuration, the CPU 121 can receive print job data as a print instruction through the communication unit 124 from the terminal apparatus 110 connected to the communication unit 124. Then, by executing an analysis program in the ROM 122, print setting information included in the print job data is acquired.

The CPU 121 then causes the printing unit 127 to execute print processing in accordance with the print setting information. In a case where image data of an image to be printed includes the print job data, the CPU 121 decompresses the image data in the RAM 123, performs processes for printing to generate print data and then outputs the print data to the printing unit 127. In a case where the print job data includes a storage location of the image to be printed, the CPU 121 may access the storage location through the communication unit 124 to acquire image data. By performing the same processes as in the aforementioned case, the printing unit 127 is caused to print the image.

Attributes such as a paper size and a paper type of print papers set in the paper feeding unit A 128 or paper feeding unit B 129 may be registered with the printing apparatus 120. The printing apparatus 120 prints in accordance with print settings in consideration of an attribute of print paper described by print setting information within print job data and an attribute registered with the printing apparatus 120. Details thereof will be described below.

Figure 2:
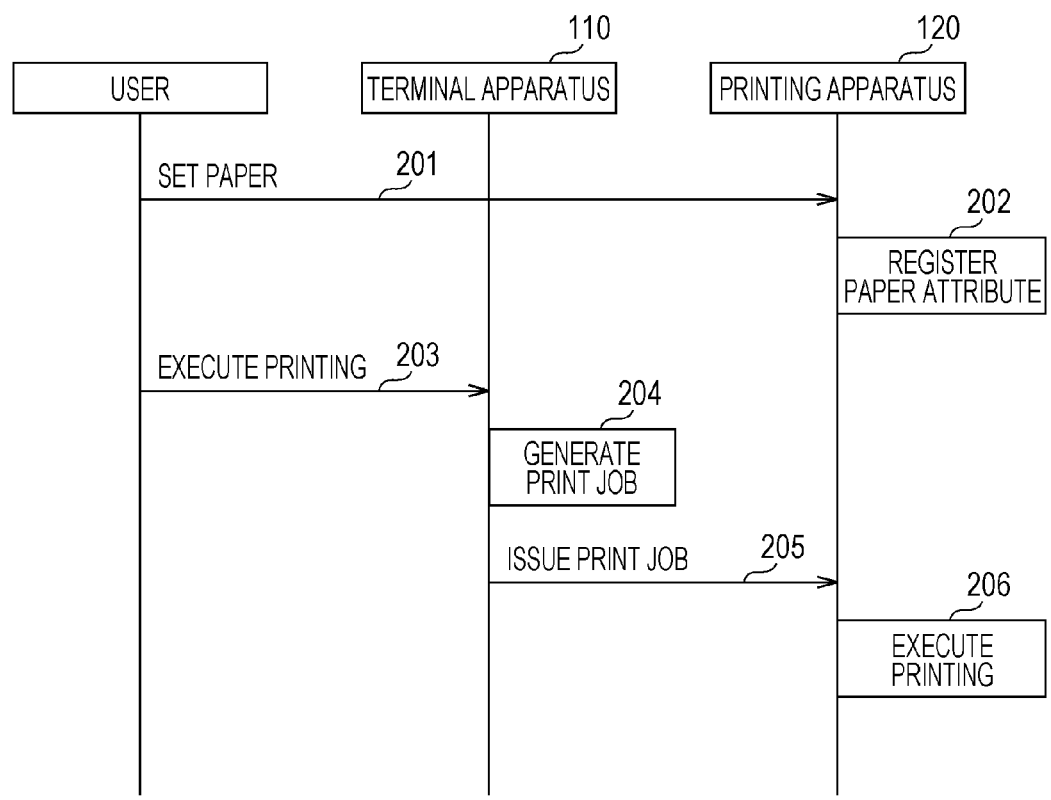
FIG. 2 illustrates print sequence in a printing system according to an embodiment.

FIG. 2 illustrates a print sequence in the printing system according to this embodiment.

In step 201, a user may set papers in the paper feeding unit A 128 or paper feeding unit B 129 in the printing apparatus 120. In step 202, a user may operate the operating unit 125 in the printing apparatus 120 to register a paper attribute on a display screen of the display unit 126. More specifically, a paper type and a paper size are registered with the printing apparatus 120. Details of the processing will be described below with reference to FIG. 3.

When the paper registration in step 202 completes, a user in step 203 may instruct execution of the printing to the terminal apparatus 110. The terminal apparatus 110 in response to the print instruction generates a print job in step 204 and issues the print job to the printing apparatus 120 in step 205. In step 206, in the print job is received from the terminal apparatus 110, the printing apparatus 120 executes the printing in accordance with details of the print job.

When a user executes a print instruction in step 203, the paper setting and the registration of a paper attribute in steps 201 and 202 are not required. In a case where papers are preset and attributes are pre-registered, a print instruction may be performed at an arbitrary time point.

In order to generate a print job in step 204, a user defines print setting conditions for execution of the printing, such as various settings including a paper size, a paper type, one-side printing/double-side printing, and a layout. The printing apparatus 120 is capable of executing printing according to various paper types.

The paper type corresponds to a property of print paper or a characteristic of a surface of print paper in a case where an ink receiving layer is provided on the surface. For example, paper types may be roughly categorized into plain paper which is mainly usable for printing a document and photographic paper which is usable for printing a photograph, for example. Paper types related to photographic paper have been varied with increases of performance of photo printing functions of ink jet printers. Thus, various paper types are included in attributes of photographic paper, such as a glossy type, a matte type, a silky type, a high-class type, and a cheap type.

For improved print quality, the printing apparatus 120 performs printing according to the various paper types. However, on the other hand, in a case where a user sets a print paper attribute such as a paper type in the terminal apparatus 110, prompting a user to select one of the various paper types may sometimes complicate user's operations. Furthermore, a registerable print setting such as a paper type may differ in accordance with the model of the printing apparatus 120. Thus, for example, prompting a user to define detail settings in accordance with the model may further complicate user's operation, preventing appropriate settings.

Accordingly, this embodiment provides a model-independent printing system (hereinafter, called a standard printing system) by which an application in the terminal apparatus 110 is not adjusted to individual specifications of each model of the printing apparatus. More specifically, a print condition (such as a paper type as a print paper attribute) set by a user in the terminal apparatus 110 is a model-independent setting. In other words, the terminal apparatus 110 prompts a user to designate a common paper type category (including a plurality of paper types) for a plurality of models, instead of prompting a user to designate such an attribute itself. Then, the printing apparatus 120 having received a print job including the print condition sets, as a print condition, a model-dependent attribute corresponding to the category designated by the user and registered with the printing apparatus 120.

In other words, a user defines rough settings necessary for printing in the terminal apparatus 110, and detail settings are defined automatically in the printing apparatus 120. This allows reduction of a load relating to the print condition settings on a user, and processes based on the detail print conditions may be performed in the printing apparatus 120. Details thereof will be described.

Figure 3:
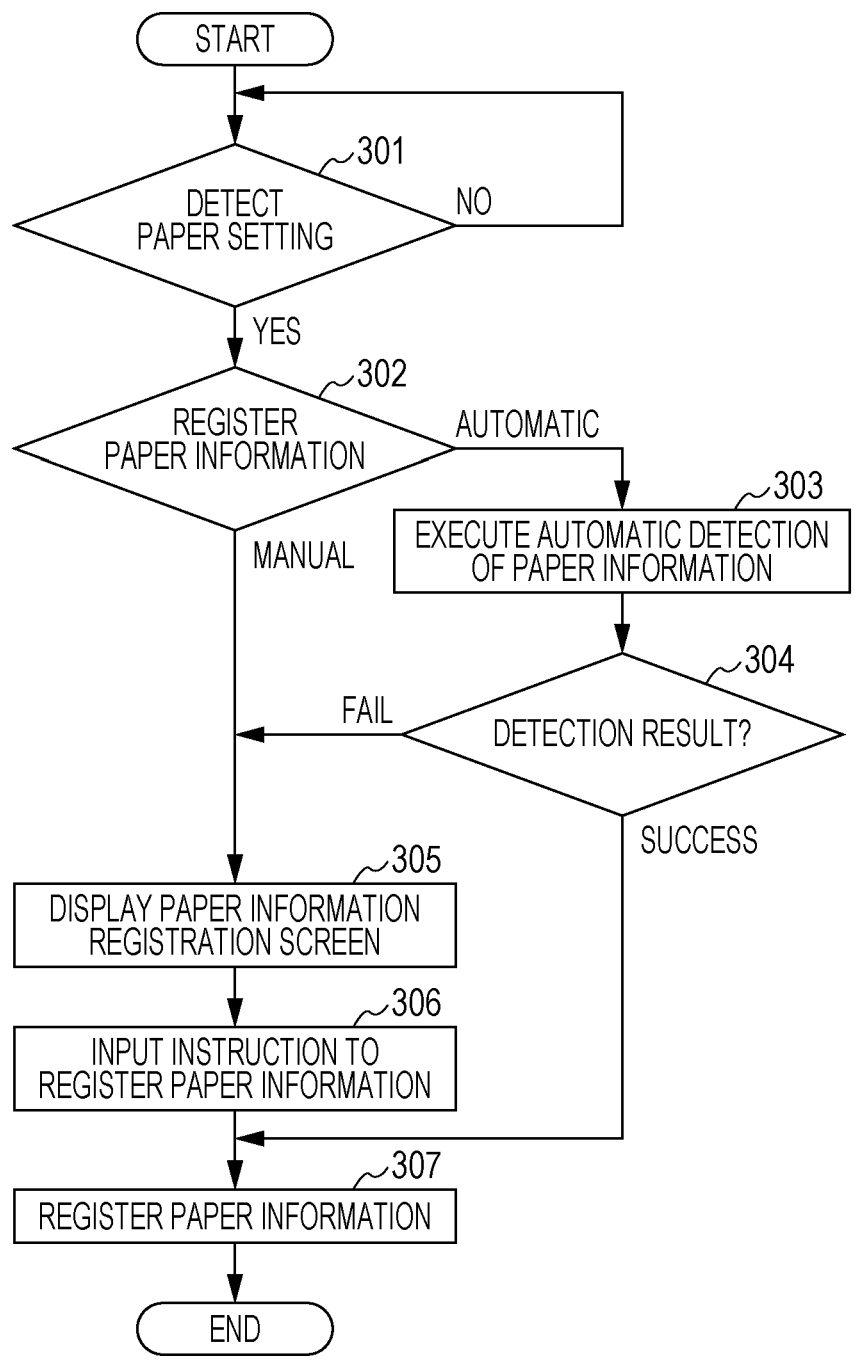
FIG. 3 is a flowchart illustrating a process for registering paper information with a printing apparatus according to an embodiment.

FIG. 3 is a flowchart illustrating processing for registering paper information in a printing apparatus according to this embodiment. The processing in FIG. 3 corresponds to step 202 in FIG. 2. A program corresponding to the processing in FIG. 3 is stored in the ROM 122, and the CPU 121 executes the program in the RAM 123 to execute the processing in FIG. 3.

In step 301, the CPU 121 determines whether paper setting into the printing apparatus 120 by a user has been detected or not. According to this embodiment, each of the paper feeding unit A 128 and the paper feeding unit B 129 has a sensor, not illustrated. The sensors in step 301 determine whether the paper setting has been detected. For example, a sensor may be provided which detects the opening or closing of a paper cassette provided in each of the paper feeding units. When the sensor detects that the paper cassette is opened or closed, the paper setting is determined. Alternatively, a sensor may be provided which detects the presence/absence of print paper in the paper cassette, and the sensor may thus determine the paper setting. Alternatively, when a user operates the operating unit 125 after paper is set, the paper setting may be notified to the CPU 121.

If the paper setting is detected in step 301, whether paper information describing an attribute (such as a size and a type) of print paper is to be registered manually or automatically is determined in step 302. Manually, a user may operate the operating unit 125 to register paper information on a screen of the display unit 126. Automatically, on the other hand, paper information may be acquired by reading a radio tag or a barcode on print paper by a reader, for example. The sensor may analyze a paper attribute such as a paper size and a paper type, and the paper information may be registered.

According to this embodiment, manual or automatic registration of paper information is preset. The CPU 121 in step 302 checks the setting to determine manual or automatic registration.

If the automatic registration is determined in step 302, automatic detection of paper information is executed in step 303. More specifically, as described above, the sensor may read a radio tag or a barcode on print paper to detect the size and type of the print paper. In step 304, the CPU 121 determines whether the automatic detection in step 303 has been performed appropriately. For example, if a radio tag or a barcode on print paper is not detected, it is determined that the automatic detection has failed. Alternatively, if a result of the detection of the size and type of the print paper by the sensor is not matched with a fixed size or a predetermined type prestored in the printing apparatus 120, it is determined that the automatic detection has failed.

If it is determined that the automatic detection has failed in step 304 or if the manual registration is determined in step 302, the processing in step 305 is executed. In step 305, the CPU 121 causes the display unit 126 to display a screen for registering the paper information. Details of the screen will be described below with reference to FIG. 4.

In step 306, an instruction to register paper information from a user is input. The register instruction includes an instruction to select a paper size and a paper type and an instruction to determine paper information. By performing the processing in step 305 and step 306, a user is allowed to check the paper information registration screen and register paper information.

In step 307, the CPU 121 registers the paper information acquired by the automatic detection in steps 303 and 304 or the paper information instructed manually by a user in steps 305 and 306. More specifically, the paper information is stored in the RAM 123 or ROM 122 in association with the paper feeding unit in which paper is set in step 301. In step 307, the CPU 121 identifies the sensor having detected the paper setting in step 301 between the sensors provided in the two paper feeding units so that the paper feeding unit in which the paper have been set can be identified. Then, the paper information is registered in association of the identified paper feeding unit.

The printing apparatus 120 may only execute the manual registration of paper information. In this case, the processing in step 302 may be omitted. The paper information registration may be executed at an arbitrary time point after the paper setting is detected without limiting to the execution in response to the detection of the paper setting in step 301.

Figures 4, 5:
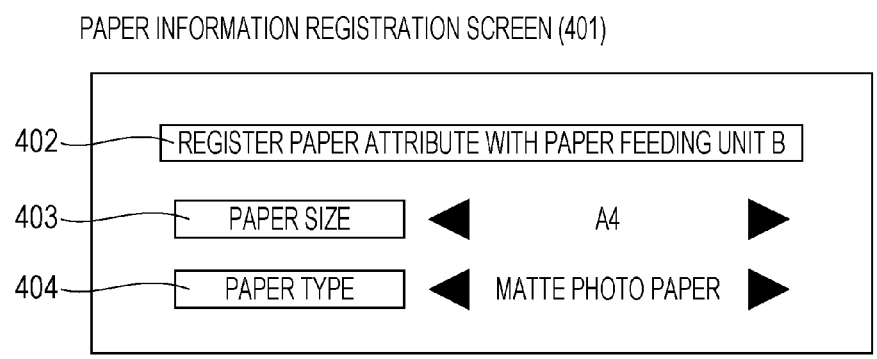
FIG. 4 illustrates a screen for registering paper information.
FIG. 5 illustrates paper information to be registered with a printing apparatus.

FIG. 4 illustrates a screen for registering paper information. The screen is displayed in step 305 above.

A display item 402 indicates a paper feed port with which paper information is to be registered between paper feed ports (paper cassettes) of the paper feeding unit A 128 and the paper feeding unit B 129. According to this embodiment, each of the paper feeding unit A 128 and the paper feeding unit B 129 has a sensor configured to detect the opening or closing of its paper cassette. Thus, if paper setting is detected in step 301, the paper feeding unit to which paper is set may be identified. Therefore, the display item 402 automatically displays the paper feeding unit in which a user has set paper.

The printing apparatus 120 may include one paper feeding unit, for example. In this case, the display item 402 may not be displayed. Alternatively, three paper feeding units may be provided.

The display item 403 may be displayed for prompting a user to register a paper size. The paper size may be A4, letter-size, L-size or the like. In a case where the operating unit 125 includes a cross key, for example, a user may use an up/down key to focus on the display item 403 and use a right/left key to input a selection instruction to select a paper size. In a case where the operating unit 125 includes a touch panel, for example, a user may touch the display item 403 and then perform a horizontal drag operation or a flick operation to input an instruction to select a paper size.

A display item 404 is displayed for prompting a user to register a paper type. Paper types may vary in plain paper, photo paper and so on. For example, selectable paper types of photo paper may include glossy photo paper, matte photo paper, and proprietary photo paper provided by a manufacturer of the printing apparatus 120. Because a paper type may be selected by performing a similar selection operation to that for selecting a paper size, the description will be omitted.

In order to perform the manual registration, the automatic detection of paper information in step 303 may be applied. For example, the paper size and paper type acquired by the automatic detection are displayed in the display items 403 and 404, and a user may check them on the screen and may change them as necessary.

A user may select desired paper information on the screen illustrated in FIG. 4 and press a confirmation key, not illustrated, in the operating unit 125. Thus, paper information registration process in step 307 is executed.

As described above, according to this embodiment, detail paper information according to the printing apparatus 120 may be registered in the registration process in FIG. 3. More specifically, detail paper types such as glossy photo paper and matte photo paper may be registered as a photo paper type.

However, in the terminal apparatus 110 according to this embodiment, "photographic paper" is settable as a paper type category, for example, but a detail paper type is not allowed to be set in the photographic paper. Therefore, in the printing apparatus 120, a detail paper type designated by the processing in FIG. 3 is registered in association with a paper type category settable in the terminal apparatus 110 corresponding to the paper information.

FIG. 5 illustrates paper information registered in the printing apparatus 120. The table illustrated in FIG. 4 is stored in the ROM 122 or RAM 123 by the processing performed by the CPU 121 in step 307.

An item "paper feed port" 501 indicates one applicable paper feeding unit of the two paper feed ports of the paper feeding unit A 128 and paper feeding unit B 129. Here, a value corresponding to "paper feeding unit A" or "paper feeding unit B" is registered as information on the paper feed port 501.

Items "paper size" 502 and "paper type" 504 indicate information on a paper size and a paper type, respectively, registered with the printing apparatus 120 by the processing in FIG. 3.

An item "paper type category" 503 indicates a category corresponding to the paper type displayed in the paper type 504. In the printing apparatus 120, the paper type registerable as the paper type 504 and a category corresponding to the paper type are associated in advance in the ROM 122. Then, the CPU 121 refers to the association to determine the paper type category 503.

FIG. 6 illustrates a correspondence between paper types and paper type categories. The table as illustrated in FIG. 6 is prestored in the ROM 122.

The paper types 601 includes plain paper, postcard, envelop, high-class photo paper, cheap photo paper, matte photo paper, glossy photo paper, silky photo paper, and film photo paper. Each paper type is associated with a paper type category 602. The paper type categories 602 include plain paper category, postcard category, envelop category, and photo paper category. In accordance with the categorization in FIG. 6, plain paper, postcard, and envelop are categorized into the plain paper category, postcard category, and envelop category, respectively, and the other types are categorized into the photo paper category.

The CPU 121 identifies a paper type category corresponding to the paper type 504 to be registered by referring to the information illustrated in FIG. 6 in step 307 in FIG. 3 and registers it as the paper type category 503. For example, as illustrated in FIG. 5, paper of "L-size glossy photo paper" and paper of "A4 matte photo paper" are set in the paper feeding unit A 128 and the paper feeding unit B 129, respectively. Thus, in the paper type category 503, "photographic paper" is registered with both of the two paper feeding units. For example, in a case where "plain paper" and "envelop" are registered as the paper type 504, "plain paper" and "envelop" may be registered with the paper type category 503.

For example, in a case where the printing apparatus has the paper feeding unit A 128 only, the value indicative of the paper feeding unit A may only be registered as the paper feed port 501, or the paper feed port 501 may be omitted. The paper information 500 may include the paper type category 503. The CPU 121 may refer to the table in FIG. 6 as required to identify the paper type category corresponding to the paper type 504.

As described above, when a user sets paper in step 201 in FIG. 2, the processing for registering paper information (step 202) described with reference to FIGS. 3 to 6 is executed.

Next, the processing in and subsequent to step 203 in FIG. 2 will be described in detail.

FIG. 7 is a flowchart illustrating a print job issuing process to be performed by the terminal apparatus 110. This process corresponds to step 204 in FIG. 2. A program corresponding to the flowchart illustrated in FIG. 7 is stored in the ROM 112 in the terminal apparatus 110, and the CPU 111 executes the program on the RAM 113 to implement the processing in FIG. 7. For example, an application program capable of implementing the flowchart illustrated in FIG. 7 is pre-installed in the ROM 112. The CPU 111 then executes the application program.

In the processing in FIG. 7, a process for connecting to the printing apparatus 120 is performed in the terminal apparatus 110 and is executed after an image to be printed is selected from images within the ROM 112 by the application in the terminal apparatus 110. For example, the processing in FIG. 7 is executed if a user selects an image to be printed on display unit 116 and "print setting button" or "print button" on the display unit 116 is then instructed.

In step 701, the CPU 111 acquires user selectable print settings in the terminal apparatus 110. More specifically, when the application program is installed, information describing the selectable print settings in the application program is stored in ROM 112. In step 701, information on print settings stored in the ROM 112 is acquired. Print settings selectable in the terminal apparatus 110 are acquired from the printing apparatus 120 through the communication unit 114.

In step 702, the CPU 111 causes the display unit 116 in the terminal apparatus 110 to display a screen for prompting a user to select a print setting. The print settings acquired in step 701 are selection candidate print settings on the screen displayed in step 702.

Figure 8:
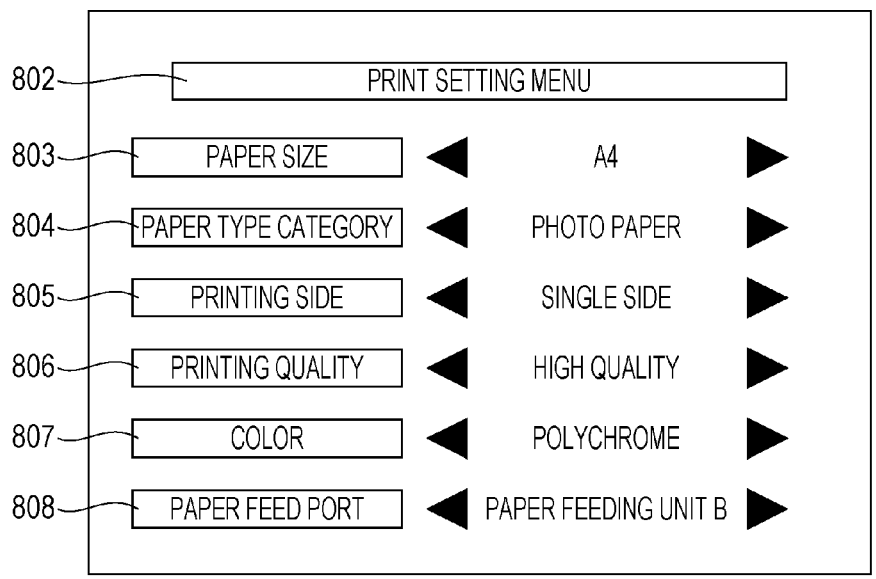
FIG. 8 illustrates a print setting screen to be displayed on a terminal apparatus.

FIG. 8 illustrates a print setting screen displayed in the terminal apparatus 110.

A print setting screen 801 includes a title 802 indicating that this screen shows a print setting menu and item names 803 to 808 indicating print setting items.

On the screen illustrated in FIG. 8, a user is allowed to select a predetermined setting for each item by using the operating unit 115. A user may select a print setting by operating a cross key or a touch panel in the operating unit 115 like the operations in the printing apparatus 120 as described with reference to FIG. 4.

The item "paper size" 803 is usable for selecting a paper size such as "A4" and "L-size".

The item "paper type category" 804 is usable for selecting a paper type category such as "photographic paper", "plain paper", "envelop", and "postcard". The paper type category 804 corresponds to the paper type category 503 registered with the printing apparatus 120, which is illustrated in FIG. 5. In other words, in the terminal apparatus 110, instead of the paper type 504 in the printing apparatus 120, a paper type category of the paper type 504 is designated.

In the printing apparatus 120, the paper type category 503 corresponding to a paper type category 804 selected in the terminal apparatus 110 is identified, and printing is performed based on the paper type 504 associated with the identified paper type category 503.

Thus, detail settings, such as the paper type 504, depending on the type of the printing apparatus 120 are automatically determined in the printing apparatus 120. Therefore, the print setting screen 801 in the terminal apparatus 110 may not display a detail paper type.

The paper type category 804 is not a detail paper type name depending on a manufacturer, unlike the paper type 504. Thus, a user may define a print setting without knowing the paper type name depending on an individual printing apparatus. Even when an application program installed in the terminal apparatus 110 supports a plurality of models of printing apparatuses, a model-dependent paper type name may not be displayed by the application.

According to this embodiment, the paper type category 804 corresponds to the paper type category 602 described with reference to FIG. 6, but they may not be identical information. For example, the paper type category 804 may be defined as a specification based on a predetermined printing system standard. For example, in the terminal apparatus 110, "plain paper", "postcard", "envelop", and "photographic paper" settable as the paper type category 804 are associated with "plain paper category", "postcard category", "envelop category", and "photo paper category", respectively, as the paper type category 602 in the printing apparatus 120. Thus, in the example in FIG. 5, "photo paper category" as the paper type category 602 in FIG. 6 is registered as "photographic paper" for the paper type category 503.

The terminal apparatus 110 and the printing apparatus 120 may use the communication unit 114 and communication unit 124 which are communication units to perform a process for synchronizing the paper type category in a negotiation process in a printing system executed when the terminal apparatus 110 and the printing apparatus 120 are connected.

The printing side 805 indicates a print layout when printing is executed, and a printing side of print paper, such as "single-side" and "both-sides", on which an image is to be printed is selected. In addition, the number of pages to be printed on one print paper such as "2in1" and "4in1", may be selected, and whether a margin is to be provided at ends of print paper, such as "borderless printing" and "bordered printing", may be selected.

A display item "print quality" 806 indicates a finish of printing, and "normal" may be selected when priority is given to the printing speed, or "high definition" may be selected when priority is given to the print quality.

A display item "color" 807 indicates color of an image to be printed, and color of an image to be printed such as "polychrome" or "monochrome" may be selected.

A display item "paper feed port" 808 is usable to designate a paper feed port to be used for printing, and a paper feed port such as "paper feeding unit A" or "paper feeding unit B" may be selected.

Settings selectable on the screen illustrated in FIG. 8 are limited to the print settings acquired in step 701. For example, in a case where the printing apparatus 120 does not support double-side printing, "single-side" is only selectable with the printing side 805. In this case, the printing side 805 may not be displayed. No particular limitation is imposed on settings selectable with the display items 803 to 808. For example, text describing "automatic" may be displayed in a case where settings are based on application specifications of the terminal apparatus 110 or on the specifications of the printing apparatus 120. In such a case, print settings with those items may be defined automatically by an application program or the printing apparatus 120. Alternatively, a setting item "automatic" may be an only option, and other item names may not be displayed. No particular limitation is imposed on the content and layout of print setting screen 801. For example, the title 802 may be omitted for the print setting menu.

In step 703 in FIG. 7, print settings are determined in accordance with user instructions given on the screen displayed as illustrated in FIG. 8, and when a confirmation is instructed with the operating unit 115, the print settings are determined. The confirmation may be instructed by a user by touching a "confirmation button", not illustrated, displayed on the display unit 126, for example, through a touch panel functioning as the operating unit 115. The thus determined print settings are stored in the RAM 113 in the terminal apparatus 110.

In step 704 in FIG. 7, the CPU 111 issues a print job in response to a touch performed on the "print button" displayed on the display unit 126 through the touch panel functioning as the operating unit 115. More specifically, the CPU 111 generates on the RAM 113 print job data including the print settings determined in step 703 and stored in the RAM 113, and the print job data are transmitted to the printing apparatus 120 through the communication unit 114. The processing in step 704 corresponds to the processing in steps 204 and 205 in FIG. 2.

Figure 9:
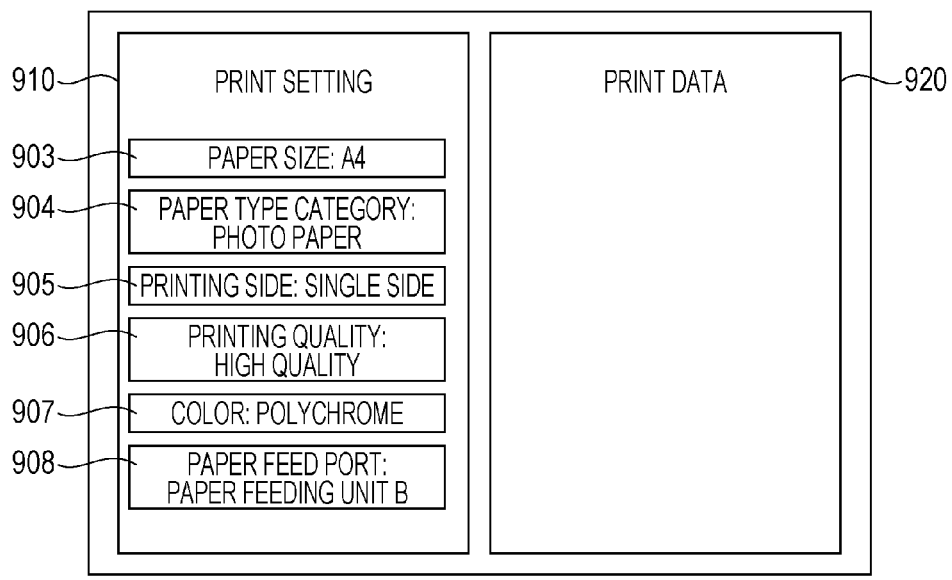
FIG. 9 illustrates an example of print job data according to an embodiment.

FIG. 9 illustrates an example of print job data according to this embodiment. The print job data are generated in step 704.

A print job 900 includes print settings 910 and print data 920. The print settings 910 have print setting information corresponding to the items 903 to 908. The print setting information corresponds to the items 803 to 808 described in FIG. 8, and includes print settings selected by a user on the screen in FIG. 8.

Print data 920 are data to be printed. In a standard printing system, the print data 920 may be a data format defined under specification and standard of the standard printing system, instead of a format inherent to the printing apparatus 120. The format of the print data 920 is not limited, but it is assumed in this embodiment that the print data 920 are JPEG image data. Other data than the print settings 910 and the print data 920 may be included in the print job 900.

The print settings 910 and the print data 920 may be put together in one file, like the print job 900, for example, or may be separate data sets. For example, the print settings 910 and the print data 920 may be divided into two data sets, and the print settings 910 are only transmitted first from the terminal apparatus 110 to the printing apparatus 120, and the print data 920 may then be transmitted.

No particular limitation is imposed on settings to be included in the print settings 910 in the print job 900, and such settings may not be linked with the values of the items 803 to 808 selected on screen displayed in FIG. 8. For example, a case is assumed where "polychrome" or "monochrome" is selected by a user by designating the color 807 on the print setting screen 801 for an item "color" 907. In this case, an application in the terminal apparatus 110 may execute image processing for rendering an image to be printed in polychrome or monochrome. In this case, because the print data 920 contain image data reflecting the color already designated by a user, the print settings 910 may not include the item "color" 907.

When the terminal apparatus 110 issues a print job including the print settings 910 by performing the processing in step 704 in FIG. 7, the print job is received by the printing apparatus 120. In step 206 in FIG. 2, the printing apparatus 120 executes printing. The print processing to be performed by the printing apparatus 120 will be described in detail.

Figure 10:
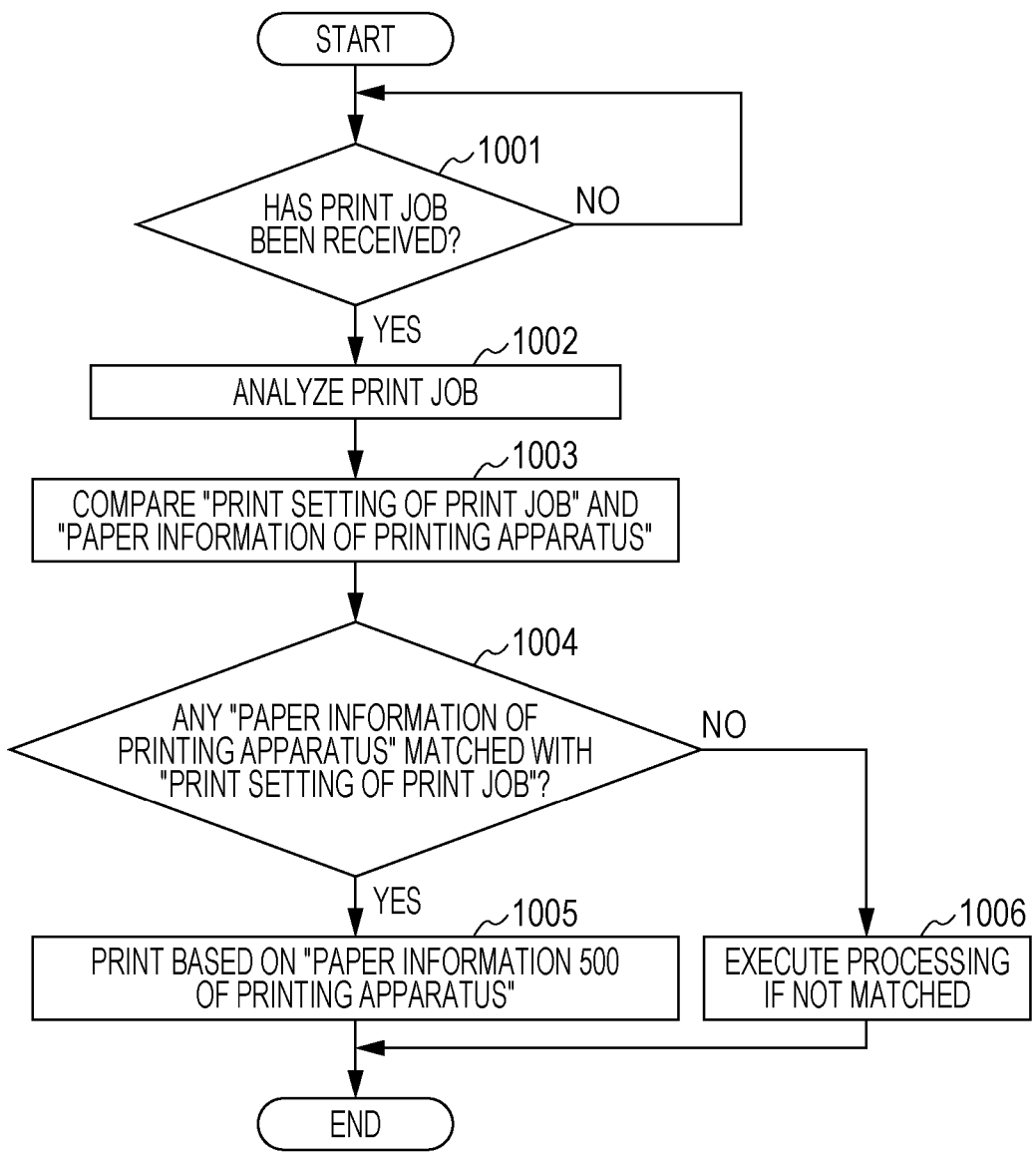
FIG. 10 is a flowchart illustrating print processing to be performed by a printing apparatus.

FIG. 10 is a flowchart illustrating print processing to be performed by the printing apparatus 120. A program corresponding to processing in FIG. 10 may be stored in the ROM 122, and the CPU 121 may execute the program on the RAM 123 so that the processing in FIG. 10 may be implemented.

In step 1001, the CPU 121 determines whether a print job 900 is received by the communication unit 124 or not. If the print job is received, the CPU 121 analyzes the print job in step 1002. More specifically, the CPU 121 acquires print settings corresponding to the items 903 to 908 in the print settings 910 included in the print job 900. The CPU 121 in step 1002 acquires paper information 500 of the printing apparatus, which is stored in the RAM 113 or ROM 112 by the processing in FIG. 3.

In the CPU 121 in step 1003 compares the "print settings 910 in the print job" and the "paper information 500 of the printing apparatus" acquired in step 1002. More specifically, they are compared with respect to three items of paper size, paper type category and paper feed port. Based on whether the paper information matched with the settings for the three items in the print settings 910 is included in the paper information 500 or not, whether the paper information is to be used or not is determined. Details of the processing in step 1003 will be described in detail with reference to FIGS. 11A and 11B.

If the paper information 500 of the printing apparatus 120 has the three items matched with those in the print settings 910, the processing moves to step 1005. The CPU 121 in step 1005 executes printing in accordance with the paper feed port 501, paper size 502 and paper type 504 defined in the paper information 500 and printing side 905, print quality 906, and color 907 in the print settings 910. In other words, the CPU 121 causes the paper feeding unit defined in the paper feed port 501 to feed print paper. Image processing according to an image processing parameter, mechanical parameter based on settings of other setting items and print paper conveyance control are performed to cause the printing unit 127 to print an image based on the print data 920. For example, in a case the printing apparatus 120 performs inkjet printing, the CPU 121 controls the components to change the ink ejection amount and the ink type according to the paper type so that printing suitable for the paper type may be executed.

On the other hand, if the paper information 500 of the printing apparatus 120 does not have the three items matched with those in the print settings 910, the CPU 121 in step 1006 performs processing for a case where they are not matched. For example, the print job 900 may be cancelled as an error. Alternatively, settings registered as the paper information 500 with the printing apparatus 120 may be applied by priority in accordance with predetermined specifications, or settings in the print settings 910 within the print job 900 may be applied by priority.

In a case where the print settings 910 which are settings in the terminal apparatus 110 are applied by priority, a predetermined paper type is applied for the paper type category in the print job 900. For example, cheap photo paper may be used as a print setting for photographic paper. In step 1006, a user may select whether the print settings 910 which are settings in the terminal apparatus 110 are to be applied by priority or the paper information 500 which are settings in the printing apparatus 120 are applied by priority. In this case, a user may be inquired by the display unit 126 in the printing apparatus 120, or the failure of matching may be notified from the printing apparatus 120 to the terminal apparatus 110 so that the inquiry may be implemented on the display unit 116 in the terminal apparatus 110.

As described above, a "forced printing" button may be displayed in a case where printing is to be executed in accordance with settings registered as the paper information 500 with the printing apparatus 120 or settings in the print settings 910 within the print job 900. The "forced printing" button is displayed after an error indication is given on the display unit 126 in the printing apparatus 120 or the display unit 116 in the terminal apparatus 110. If the "forced printing" button is pressed by a user, printing is performed in accordance with the paper size (paper type category) and paper type in the paper information 500 in the printing apparatus 120 or defined in the print job 900.

If the settings in the print job 900 are to be applied by priority and only if the paper size designated in the print job 900 is equal to or smaller than the paper size in the paper information 500, for example, the "forced printing" button may be displayed. If the paper size designated in the print job 900 is larger than that in the paper information 500, printing an image corresponding to the paper size in the print job 900 may sometimes result in an image printed larger than the actual size of paper and partially lacking. Therefore, in this case, the "forced printing" button may not be displayed to prevent printing such a partially lacking image.

Alternatively, if the "forced printing" button is pressed, printing may be performed on print paper from a paper feeding unit with a paper size equal to or larger than the paper size designated in the print job 900 between the two paper feeding units. If such a paper feeding unit is not available, an error indication may be given or the "forced printing" button may not be displayed in the first place.

In step 1006, the settings in the paper information 500 may be notified from the printing apparatus 120 to the terminal apparatus 110. The paper type category and paper size corresponding to the paper information 500 may then be displayed in the terminal apparatus 110. This allows a user in the terminal apparatus 110 may reset the print settings by grasping the settings supported the printing apparatus 120. In this case, the terminal apparatus 110 may issue a print job again, or the changed print settings 910 may be transmitted from the terminal apparatus 110 to the printing apparatus 120. In the latter case, the printing apparatus 120 prints the print data 920 within the print job 900 received when an error occurs in accordance with the received changed print settings.

Figure 11B:
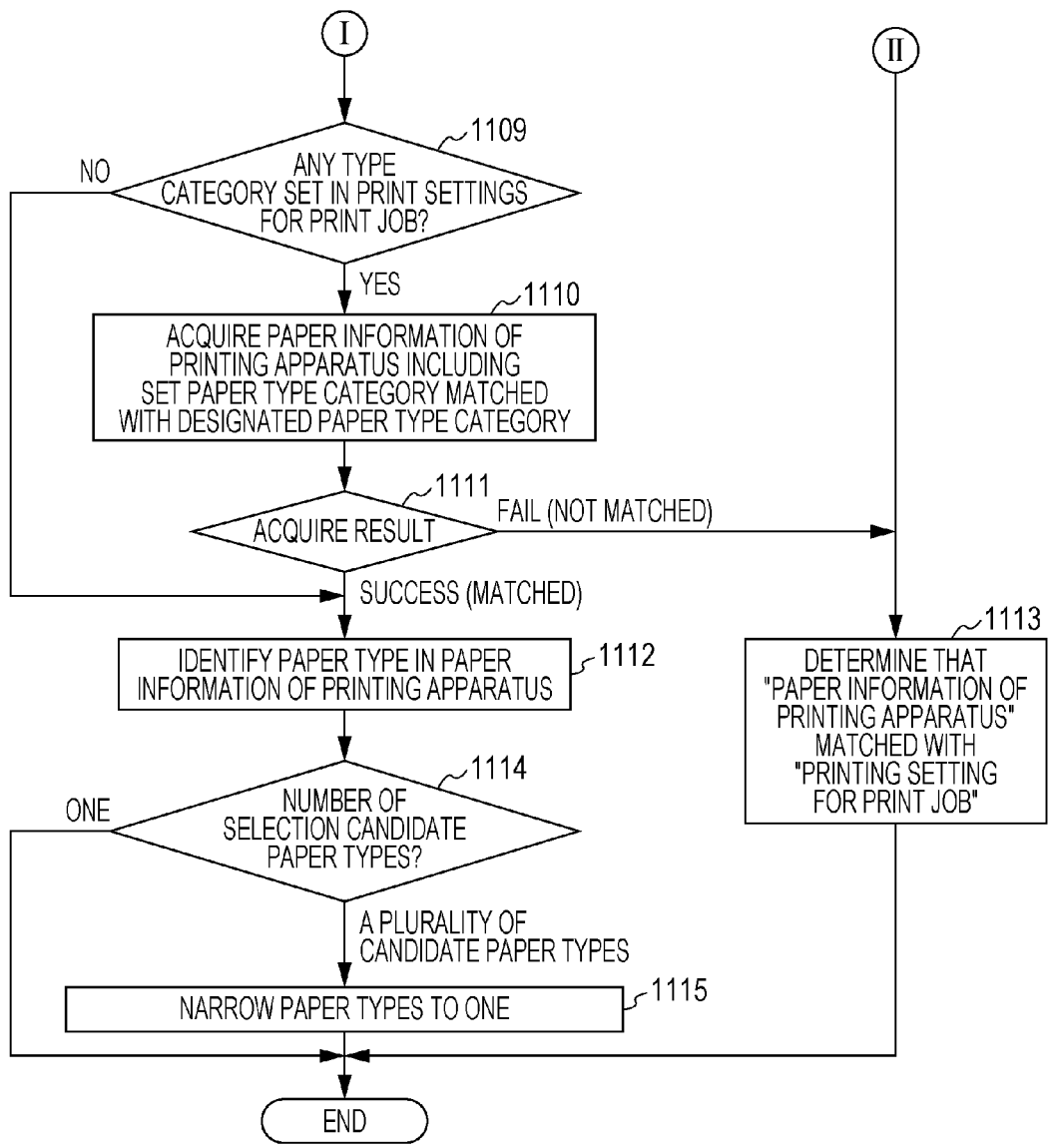

FIGS. 11A and 11B illustrate a flowchart describing details of the processing for comparing print settings to be performed by the printing apparatus 120. The flowchart in FIGS. 11A and 11B illustrates details of the processing in step 1004 in FIG. 10.

The CPU 121 in step 1101 determines the presence/absence of a paper feed port designated in the print settings 910 in a print job. For example, in a case where "automatic" is selected for the paper feed port item 808 on the screen illustrated in FIG. 8, the paper feed port item 908 in the print job displays "automatic" or is left blank. In this case, it is determined that no paper feed port is designated in the print settings 910. The processing moves to step 1105 if not in step 1101 while the processing moves to step 1102 if so.

The CPU 121 in S1102 refers to the paper information 500 and acquires paper information corresponding to the paper feed port designated in the print setting 910 in the print job. More specifically, a paper feed port designated in the print setting 910 is specified between the two paper feed ports specified under the paper feed port 501. The paper size, paper type category 503, and paper type 504 in the paper information having the paper feed port 501 matched with the paper feed port is acquired.

However, paper information may not be registered with the printing apparatus 120 for the paper feed port designated in a print job. For example, "paper feeding unit B" may be designated in the print job 900 while paper information including "paper feeding unit B" may not be registered in the paper information of the printing apparatus. For that, the CPU 121 in step 1103 may determine whether the paper information has been acquired in step 1102 or not is determined. If not, the processing moves to step 1113. In step 1113, it may be determined that no paper information 500 of the printing apparatus is matched with the print settings 910 in the print job. In this case, "No" is determined in step 1004 in FIG. 10.

On the other hand, if the paper information has been acquired in step 1102, "Yes" is determined in step 1103, and the processing moves to step 1104. The CPU 121 in step 1104 narrows paper information candidates registered with the printing apparatus 120. For example, in a case where "paper feeding unit B" is designated in a print job and paper information including "paper feeding unit B" is also included in the paper information 500 of the printing apparatus, the paper information including "paper feeding unit B" is only handled as a print setting candidate to be used finally in printing. The other paper information of the printing apparatus, such as paper information including "paper feeding unit A", for example, is excluded from the print setting candidates.

Next, the CPU 121 in step 1105 determines whether a paper size is designated in the print settings 910 in the print job. In other words, whether a user has designated a paper size as the paper size 803 on the screen in FIG. 8 and whether "automatic" is designated are determined. The determination method is performed in the same manner as in step 1101. If a paper size is designated, the CPU 121 in step 1106 acquires paper information on paper for the printing apparatus as the paper size 502 matched with the paper size designate in the print job. The acquisition method is the same as that in step 1102. If the paper information candidates are not narrowed in step 1104, whether the paper size designated in the print job is set or not based on the narrowed paper information only.

The CPU 121 in step 1107 determines whether paper information including the paper size matched with the paper size designated in the print job has been acquired. If not, the aforementioned processing is executed in step 1113. For example, the processing in step 1113 is executed if the "A4" is designated in the print job 900 and print information including "A4" is not registered in the paper information of the printing apparatus. If it is determined in step 1107 that paper information including a paper size matched with the paper size designated in the print job has been acquired, the processing moves to step 1108.

The CPU 121 in step 1108 narrows print setting candidates to the paper information acquired in step 1106. For example, if a print job includes "A4" is designated as a paper size and a setting including the paper size "A4" is also registered in the paper information 500 of the printing apparatus, the paper information including "A4" is included in print setting candidates. The other paper information of the printing apparatus such as paper information of the printing apparatus including "L-size" is excluded from print setting candidates.

Next, the CPU 121 in step 1109 determines whether a paper type category is designated in the print job. In other words, whether the paper type category 804 in FIG. 8 has a paper type category designated by a user and whether "automatic" is designated is determined. This determination method is the same as those in steps 1101 and 1105. If it is determined in step 1109 that a paper type category is designated in the print job, the processing moves to step 1110.

The CPU 121 in step 1110 acquires paper information having the paper type category 503 in the print paper information 500 matched with the paper type category designated in the paper type category 904 in the print settings 910 in the print job. If paper information is narrowed in step 1108, the narrowed paper information is only a subject of the processing in step 1110.

The CPU 121 in step 1111 determines whether the paper information has been acquired by the processing in step 1110. The determination method is the same as those in steps 1103 and 1107. If it is determined in step 1111 that the paper information has not been acquired in step 1110, the processing in step 1113 is executed. For example, if "photographic paper" is designated in the print job and if no paper information including "photographic paper" is registered in the paper information of the printing apparatus, the processing in step 1113 is executed.

If it is determined in step 1111 that paper information has been acquired, the processing moves to step 1112. For example, if "photographic paper" is designated in the paper type category 904 in the print job 900 and paper information including "photographic paper" as the paper type category 503 of the paper information 500 is registered, the paper information is acquired, and the processing in step 1112 is executed.

The CPU 121 in step 1112 identifies the paper type 504 set in the paper information acquired in step 1110.

For example, as a result of the processing in steps 1101 to 1111, paper information displayed in a lower row of the table illustrated in FIG. 5 may be left as a print setting candidate, and "photographic paper" may be designated as the paper type category 904 in the print job 900. In this case, in step 1112, "matte photo paper" is identified as the paper type 504.

In a case where, for example, the narrowing in steps 1104 and 1108 is not performed and the paper information corresponding to the paper feeding unit A 128 and paper feeding unit B 129 includes a paper type category designated in the print job 900, two paper type candidates exist. In a case where none of the paper feed port, paper size, and paper type category is designated in the print job 900, two paper type candidates exist.

Accordingly, the CPU 121 in step 1114 determines whether a plurality of paper types 504 exist as candidates to be selected as a print setting usable for printing. In a case where candidates have been narrowed into one, the processing in FIGS. 11A and 11B completes. The paper information including the narrowed paper type 504 is used as a print setting in the printing in step 1005 in FIG. 10.

On the other hand, if a plurality of paper types 504 exist as print setting candidates, the candidates are narrowed into one based on predetermined priority order in step 1115. For example, based on priority order determined for paper feeding units, a paper type registered for one having a high priority level between the paper feeding unit A 128 and the paper feeding unit B 129 is selected. Then, the paper information including the narrowed paper type 504 is used as a print setting in the printing in step 1005 in FIG. 10. The priority order for paper feeding units may be fixed or may be determined by a user by operating the operating unit 125 on a screen of the display unit 126, for example. A paper feeding unit having a high priority level between the paper feeding unit A 128 and the paper feeding unit B 129 may be predetermined as a default setting, and a user may change the priority level. If the priority order is fixed, any one of the paper feeding unit A 128 and paper feeding unit B 129 may have a higher priority level. However, in a case where, for example, two paper feeding units are provided on horizontal two steps under the printing unit 127 in the printing apparatus 120, the paper feeding unit placed at the higher step may have a higher priority level. Because the distance is short from a paper feeding unit placed at a higher step to the printing unit 127, giving high priority to the paper feeding unit placed at a higher step may improve the printing speed.

If it is determined in step 1114 that a plurality of paper types exist as print setting candidates, the processing in step 1113 may be executed. Alternatively, the paper information 500 of the printing apparatus may be narrowed by using the color 907, printing side 905 designated in the print job 900, for example. It is assumed, for example, that one of two candidates belongs to the photo paper category and the other belongs to the plain paper category. Plain paper may often be used as print paper when "monochrome" is designated as the color 907 and "both-sides" is designated as the printing side 905. Thus, if "monochrome" is designated as the color 907 or if "both-sides" is designated as the printing side 905, paper information having "plain paper" set as the paper type 504 may be selected.

FIGS. 11A and 11B illustrate an example in which a print job and paper information are compared in order of the items of paper feed port, paper size, and paper type category. However, items to be compared and the comparison order are not limited thereto. For example, the comparison and narrowing on paper feeding units in steps 1101 to 1104 may not be performed. Furthermore, the comparison and narrowing on paper sizes in steps 1105 to 1108 may not be performed.

As described above, the processing in FIGS. 11A and 11B compares a print setting designated by a user in the terminal apparatus 110 and paper information registered with the printing apparatus 120. Then, paper information matched with the print setting designated by a user is selected as a print setting usable for printing. Thus, printing may be securely implemented in accordance with attributes (size, type) of print paper desired by a user and set in the printing apparatus 120.

According to the processing in FIGS. 11A and 11B, a user designates a rough paper type category such as "photographic paper" to the terminal apparatus 110 instead of a detail attribute such as the paper type 504 in the printing apparatus 120. Paper information having the paper type category corresponding to the paper type category designated by a user is acquired, and the detail paper type 504 designated in the paper information is automatically reflected to the print settings.

This allows a user to designate a paper type easily in the terminal apparatus 110 and thus printing based on the detail paper type registered with the printing apparatus 120.

According to this embodiment, the terminal apparatus 110 may not have to designate a detail paper type dependent on the model of the printing apparatus 120 and however is allowed to execute printing based on such a detail paper type. Thus, for example, because an application for printing which operates on the terminal apparatus 110 may not be required to be dependent on the model of the printing apparatus 120, the application may be usable for printing apparatuses of a plurality of models. Therefore, for example, when a user owns printing apparatuses of a plurality of models, the user may not be required to install applications individually supporting such a plurality of model. Application developers may not be required to develop applications individually supporting such a plurality of models.

Next, print settings to be set by the processing described with reference to FIGS. 11A and 11B will be described with reference to FIGS. 12A to 12C. FIGS. 12A to 12C illustrate an example of a result of a print setting process according to this embodiment.

Paper information illustrated in FIG. 12A is registered as the paper information 500 of a printing apparatus. FIG. 12C illustrates print settings to be actually used in the printing in step 1005 in FIG. 10 when settings of cases 1 to 3 are executed as print settings 1210 of a terminal apparatus.

The print settings 1210 of the terminal apparatus in the case 1 includes "paper feeding unit B" designated as a paper feed port, "A4" designated as a paper size, and "photographic paper" designated as a paper type category. When the print job 900 including the print settings 910 is issued, the printing apparatus performs the processing according to the flow illustrated in FIGS. 10 to 11B.

In this case, paper information in the bottom row of FIG. 12A including settings of "paper feeding unit B", "A4" and "photographic paper" is matched with the print settings of the print job. Thus, as a result of the processing illustrated in FIGS. 11A and 11B, the paper type "matte photo paper" in the paper information 500 of the printing apparatus is identified, and the paper type "matte photo paper" is set as a setting result 1220 which is a print setting to be used for printing.

The print settings 1210 of the terminal apparatus in the case 2 includes "automatic" designated as a paper feed port, "L-size" designated as a paper size, and "photographic paper" designated as a paper type category. When the print job 900 including the designated settings is issued, either "paper feeding unit A" or "paper feeding unit B" may be used because "automatic" is designated as the paper feed port. Therefore, in step 1104 in FIG. 11A, paper information in the upper and lower rows in the paper information 500 is left as candidates. However, because the candidates are narrowed into the paper information in the upper row having "L-size" and "photographic paper" designated in the print job, "glossy photo paper" as a paper type in the upper row is identified as the setting result 1220.

The print settings 1210 of the terminal apparatus in the case 3 has "automatic", set as a paper feed port, "A4" set as a paper size and "plain paper" set as a paper type category. When the print job 900 having these settings designated is issued, no paper information 500 of the printing apparatus having settings matched with "A4" and "plain paper" exists while either "paper feeding unit A" or "paper feeding unit B" may be used because "automatic" is designated as a paper feed port. Therefore, none of the paper types "glossy photo paper" and "matte photo paper" in the paper information 500 of the printing apparatus is selected. More specifically, the candidates are narrowed into the paper information in the lower row of FIG. 12A in step 1108 in FIG. 11A. Then, it is determined in step 1111 that paper information has not been acquired, and the processing in step 1113 is executed. As a result, the processing in step 1006 in FIG. 10 is executed.

As described above, the processing in step 1006 (or processing to be performed if print settings in a print job and paper information of a printing apparatus are not matched) is not limited, but an error indication is given on the display unit 126 in the printing apparatus 120. The case 3 occurs when a user has improperly set paper to or has performed an improper registration operation on the printing apparatus 120 or when an improper print setting is defined in the terminal apparatus 110. In such cases, an error notification may be given to a user in step 1006 so that the user may be prompted to check registered paper information or print settings in the terminal apparatus 110.

As described above, according to this embodiment, if paper information registered when paper are set in the printing apparatus 120 is matched with the print settings designated by a user in the terminal apparatus 110, the paper information is selected as print settings for executing printing. Thus, printing may be securely implemented in accordance with attributes (size, type) of print paper desired by a user and set in the printing apparatus 120.

According to the present invention, a user may set a rough paper type category in the terminal apparatus 110 so that the detail paper type matched with the print paper set in the printing apparatus 120 is automatically reflected to the print setting. This allows a user to designate a paper type easily in the terminal apparatus 110 and thus printing based on the detail paper type according to the paper set in the printing apparatus 120.

According to this embodiment, a user roughly designates a paper type category in terminal apparatus 110. However, the present invention is not limited thereto. For example, a user may designate a paper size category indicating a category of paper size in the terminal apparatus 110, and a detail paper size matched with the paper size category is automatically reflected to the print setting in the printing apparatus 120.

According to this embodiment, the CPU 121 in the printing apparatus 120 operates as a print control apparatus of this embodiment and executes the processing in FIG. 10. However, without limiting thereto, a server apparatus may operate as the print control apparatus and execute the processing in FIG. 10, for example.

For example, a server apparatus may acquire paper information (500 in FIG. 5) from the printing apparatus 120 connected to the server over the Internet. The server apparatus may then receive the print job 900 from the terminal apparatus 110 and execute the processing in FIG. 10 in the server apparatus. By performing the processing in FIG. 10, paper information matched with the print settings 910 included in the print job 900 may be identified. The paper type category 904 included in the print job 900 may be changed to the detail paper type 504 set in the identified paper information, and the resulting print job may be transmitted from the server apparatus to the printing apparatus 120.

Also in this case, a user may set a paper type category as a rough setting in the terminal apparatus 110 so that printing according to the detail paper type corresponding to the paper set in the printing apparatus 120 may be executed.

Alternatively, a personal computer (PC) may operate as the print control apparatus according to this embodiment.

According to this embodiment, when the printing apparatus 120 receives a print job from the terminal apparatus 110 that is an external apparatus, the print settings are automatically determined, for example. Without limiting thereto, a user may operate the operating unit 125 in the printing apparatus 120, and an image stored in a memory within the printing apparatus 120 or in an external memory such as a memory card mounted in the printing apparatus 120. In this case, a print setting screen as illustrated in FIG. 8 may be displayed on the display unit 126 in the printing apparatus 120. Also in this case, a user may designate rough category information as a paper type so that printing may be executed based on the detail paper type corresponding to the print paper set in the printing apparatus 120.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus which communicates with a terminal apparatus, the printing apparatus comprising:
    at least one processor;
    a memory configured to store information for specifying first paper attributes selectable on the terminal apparatus, wherein the printing apparatus transmitting the information to the terminal apparatus results in the terminal apparatus displaying the first paper attributes, based on the information, and displaying, in the displayed first paper attributes, a first paper attribute that corresponds to second paper attributes selectable on the printing apparatus; and
    a printing unit,
    wherein the at least one processor acquires a second paper attribute selected on the printing apparatus as a paper attribute of print paper set in the printing apparatus,
    wherein the at least one processor receives a first paper attribute for printing of an image and which is selected by a user on the terminal apparatus from the displayed first paper attributes,
    wherein, in a case where the displayed first paper attribute corresponding to second paper attributes is received and any of the second paper attributes corresponding to the displayed first paper attribute is acquired, the at least one processor causes the printing unit to print the image, and
    wherein, in a case where the displayed first paper attribute corresponding to second paper attributes is received and a second paper attribute different from the second paper attributes is acquired, the at least one processor causes the printing unit not to print the image.

2. The printing apparatus according to claim 1,
    wherein the at least one processor obtains a second paper attribute corresponding to each of a plurality of pieces of print paper set in the printing apparatus, and
    wherein the at least one processor selects, from the plurality of pieces of print paper, print paper on which the image is to be printed based on the obtained second paper attribute, and causes the printing unit to print the image on the selected print paper.

3. The printing apparatus according to claim 2, further comprising a plurality of paper feeding units in which the plurality of pieces of print paper is to be set,
    wherein the at least one processor receives a second paper attribute corresponding to each of the plurality of paper feeding units as a second paper attribute corresponding to each of the plurality of pieces of print paper, and
    wherein the at least one processor selects one of the plurality of paper feeding units for printing the image so that print paper on which the image is to be printed is selected from the plurality of pieces of print paper.

4. The printing apparatus according to claim 3,
    wherein the at least one processor further receives information for designating one of the plurality of paper feeding units in the printing apparatus, and
    wherein the at least one processor causes the printing unit to print the image in a case where any of the second paper attributes corresponding to the displayed first paper attribute is acquired as a second paper attribute of a designated paper feeding unit.

5. The printing apparatus according to claim 1, wherein, in a case where any of the second paper attributes corresponding to the displayed first paper attribute is acquired, the at least one processor causes the printing unit to print the image in accordance with the second paper attribute.

6. The printing apparatus according to claim 1,
    wherein the printing apparatus transmitting the information to the terminal apparatus further results in the terminal apparatus displaying first paper sizes as selection candidate paper sizes based on the information, and
    wherein the at least one processor receives a first paper size which is selected by the user on the terminal apparatus from the displayed first paper sizes.

7. The printing apparatus according to claim 1, wherein each of the second paper attributes corresponds to a property of the print paper or a characteristic of a surface of the print paper.

8. The printing apparatus according to claim 7,
    wherein the at least one processor further receives, for printing of the image, a first paper size which is selected by the user on the terminal apparatus,
    wherein the at least one processor further acquires a second paper size of the print paper set in the printing apparatus, and
    wherein, in a case where the first paper size and the second paper size are matched and any of the second paper attributes corresponding to the displayed first paper attribute is acquired, the at least one processor causes the printing unit to print the image.

9. The printing apparatus according to claim 1, wherein the at least one processor receives, from the terminal apparatus, the displayed first paper attribute corresponding to second paper attributes.

10. The printing apparatus according to claim 9, wherein the at least one processor further receives, from the terminal apparatus, data corresponding to the image and causes the printing unit to print the image based on the received data.

11. The printing apparatus according to claim 10, wherein the at least one processor receives, from the terminal apparatus, a print job and the received data and the received first paper attribute are included in the received print job.

12. The printing apparatus according to claim 1,
    wherein the second paper attribute selected on the printing apparatus and acquired by the at least one processor was selected by the user,
    wherein the at least one processor registers the user-selected acquired second paper attribute, and
    wherein the at least one processor acquires the registered second paper attribute.

13. The printing apparatus according to claim 12, further comprising a display unit, wherein the at least one processor causes the display unit to display a screen for registration of a paper attribute and registers the user-selected acquired second paper attribute in accordance with an instruction received from the user on the screen.

14. The printing apparatus according to claim 13, further comprising a sensor configured to detect opening or closing of a paper cassette for setting print paper,
wherein, in a case where the sensor detects that the paper cassette has been opened or closed, the at least one processor causes the display unit to display the screen.

15. The printing apparatus according to claim 1, further comprising a display unit,
wherein, in the case where the displayed first paper attribute corresponding to second paper attributes is received and the second paper attribute different from the second paper attributes is acquired, the at least one processor causes the display unit to display a predetermined display item, and
wherein, in a case where the displayed predetermined display item is designated by the user, the at least one processor causes the printing unit to print the image.

16. A method for a printing apparatus having a printing unit and which communicates with a terminal apparatus, the method comprising:
storing information for specifying first paper attributes selectable on the terminal apparatus, wherein the printing apparatus transmitting the information to the terminal apparatus results in the terminal apparatus displaying the first paper attributes, based on the information, and displaying, in the displayed first paper attributes, a first paper attribute that corresponds to second paper attributes selectable on the printing apparatus;
acquiring a second paper attribute selected on the printing apparatus as a paper attribute of print paper set in the printing apparatus;
receiving a first paper attribute for printing of an image and which is selected by a user on the terminal apparatus from the displayed first paper attributes;
causing, in a case where the displayed first paper attribute corresponding to second paper attributes is received and any of the second paper attributes corresponding to the displayed first paper attribute is acquired, the printing unit to print the image; and
causing, in a case where the displayed first paper attribute corresponding to second paper attributes is received and a second paper attribute different from the second paper attributes is acquired, the printing unit not to print the image.

17. A printing apparatus which communicates with a terminal apparatus, the printing apparatus comprising:
at least one processor;
a memory configured to store information for specifying first paper sizes selectable on the terminal apparatus, wherein the printing apparatus transmitting the information to the terminal apparatus results in the terminal apparatus displaying the first paper sizes as selection candidates based on the information, and wherein a first paper size in the first paper sizes displayed on the terminal apparatus corresponds to second paper sizes which can be registered on a display unit of the printing apparatus;
a printing unit; and
the display unit configured to display a screen,
wherein, in a case where a sensor detects that a paper cassette for setting pieces of print paper has been opened or closed, the display unit is configured to display a screen for registration of a second paper size,
wherein the at least one processor registers the displayed second paper size in accordance with an instruction received from a user on the registration screen displayed by the display unit,
wherein the at least one processor receives, for printing of an image, a displayed first paper size which is selected by the user on the terminal apparatus from the displayed first paper sizes,
wherein, in a case where the registered second paper size corresponds to the received first paper size, the at least one processor causes the printing unit to print the image, and
wherein, in a case where the registered second paper size does not correspond to the received first paper size, the at least one processor causes the printing unit not to print the image.

18. The printing apparatus according to claim 17, further comprising a plurality of paper feeding units in which the plurality of pieces of print paper is to be set,
wherein the displayed second paper size registered by the at least one processor corresponds to each of the plurality of paper feeding units, and
wherein, in a case where the registered second paper size corresponding to a paper feeding unit designated by the user corresponds to the received first paper size, the at least one processor causes the printing unit to print the image.

19. The printing apparatus according to claim 17,
wherein first paper types, selectable on the terminal apparatus, are specified by the information stored in the memory,
wherein the printing apparatus transmitting the information to the terminal apparatus results in the terminal apparatus displaying the first paper types as selection candidates based on the information,
wherein the at least one processor further registers a displayed second paper type in accordance with an instruction received from the user on the registration screen displayed by the display unit,
wherein the at least one processor further receives, for printing of the image, a first paper type which is selected by the user on the terminal apparatus from the displayed first paper types, and
wherein, in a case where each of the registered second paper size and the registered second paper type corresponds to each of the received first paper size and the received first paper type, the at least one processor causes the printing unit to print the image.

20. The printing apparatus according to claim 17,
wherein, in a case where the registered second paper size does not correspond to the received first paper size, the at least one processor causes the display unit to display a predetermined display item, and
wherein, in a case where the displayed predetermined display item is designated by the user, the at least one processor causes the printing unit to print the image in accordance with the received first paper size.

21. The printing apparatus according to claim 17, wherein, in a case where the registered second paper size corresponds to the received first paper size, the at least one processor causes the printing unit to print the image in accordance with the registered second paper size.

22. The printing apparatus according to claim 17, wherein, in a case where the registered second paper size corresponds to the received first paper size, the at least one processor executes image processing on the image in accordance with the registered second paper size.

23. The printing apparatus according to claim 1, wherein, in a case where any of the second paper attributes corresponding to the displayed first paper attribute is acquired, the at least one processor executes image processing on the image in accordance with the acquired second paper attributed.

* * * * *